Patented Oct. 31, 1944

2,361,823

UNITED STATES PATENT OFFICE 2,361,823

METHOD OF PREPARING HYDROCARBON-SUBSTITUTED AMINO TRIAZINES

Gaetano F. D'Alelio and James J. Pyle, Pittsfield, Mass., assignors to General Electric Company, a corporation of New York No Drawing. Application May 30, 1942, Serial No. 445,192

13 Claims. (Cl. 260—249.5)

This invention relates to a novel method of producing triazine derivatives. More particularly the invention is concerned with a novel method of preparing useful triamino triazines wherein one or more of the amino groups is a hydrocarbon-substituted amino group.

The triamino triazines produced in accordance with the present invention may be illustrated graphically by the following general formula:

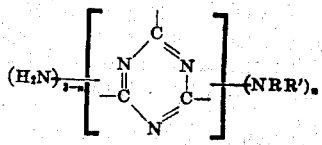

In the above formula $n$ represents an integer and is at least 1 and not more than 3, R represents a monovalent hydrocarbon radical, and R' represents a member of the class consisting of hydrogen and monovalent hydrocarbon radicals.

Illustrative examples of monovalent hydrocarbon radicals that R and R' in the above formula may represent are: aliphatic (e. g., methyl, ethyl, propyl, isopropyl, allyl, butyl, secondary butyl, crotyl, methallyl, ethallyl, heptyl, isoheptyl, octyl, decyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues.

The chemical compounds produced by practicing our invention have wide use in industry, for example in the preparation of synthetic resins, pharmaceuticals and dyes. However, the prior methods of making these compounds have involved the preparation of several intermediates, thereby adding considerably to the cost of the final product. We have now found that these intermediate steps in the manufacture of the compounds are unnecessary and that the desired compound can be produced directly from thioammeline, a compound that is now available commercially.

Heretofore hydrocarbon-substituted amino triazines, which for purpose of brevity are referred to hereinafter and in the appended claims as "hydrocarbon-substituted melamines," were made either from cyanuric acid, ammelide, ammeline or from the esters of (1) thioammeline, (2) di-thioammelide or (3) tri-thiocyanuric acid.

The production of hydrocarbon-substituted melamines from cyanuric acid, ammelide or ammeline involved the preparation of the corresponding chloride by reaction with $PCl_3$. This chloride then was reacted with a primary or secondary amine to give the desired hydrocarbon-substituted melamine. This reaction may be represented by the following equation:

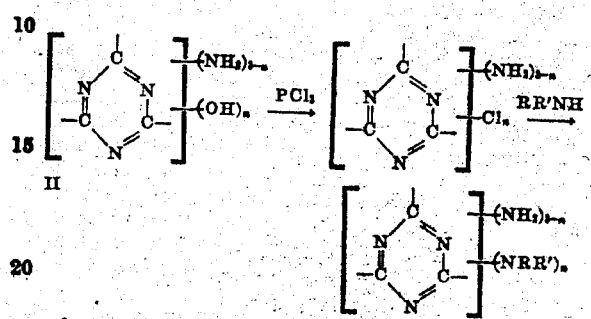

where $n$, R and R' have the same meanings as given for Formula I.

The production of hydrocarbon-substituted melamines from (1) thioammeline, (2) di-thioammelide or (3) tri-thiocyanuric acid required the preparation of the ester by reaction with an alkyl halide, which ester was then reacted with an amine to give the desired hydrocarbon-substituted melamine. This reaction may be represented by the following equation:

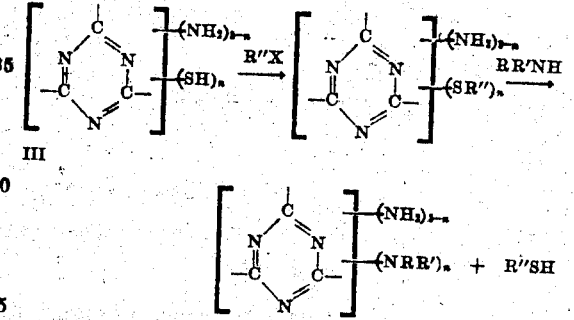

where $n$, R and R' have the same meanings as given above with reference to Formula I and R''X represents an alkyl halide.

We have now found that if thioammeline is reacted with any primary or secondary amine, preferably in the presence of a mineral acid salt of the amine, an unexpected and unpredictable reaction takes place, namely, hydrogen sulfide and ammonia are given off. After all the hydrogen sulfide has been expelled ammonia may still be caused to escape. The final product, which may be fractionated, is a mixture of mono-, di- and tri-hydrocarbon substituted melamines.

Illustrative examples of primary and secondary amines that may be used in practicing our invention are:

Aniline
Octyl amino (mono-octyl amine)
Methyl amine
Di-methyl amine
Ethyl amine
Methyl ethyl amine
Di-ethyl amine
Propyl amine
Isopropyl amine
Di-propyl amine
Allyl amine
Di-isopropyl amine
Methyl propyl amine
Ethyl propyl amine
Crotyl amine
Butyl amine
Isobutyl amine
Secondary butyl amine
Di-butyl amine
Butyl ethyl amine
Decyl amine
Octadecyl amine
Cyclohexyl amine
Cyclopentyl amine
Cyclohexenyl amine
Pentyl amine
Para-chloroaniline
Toluidine
Xylidine
N-methyl aniline
Benzyl amine
Allylphenyl amine
Naphthyl amine
Phenethyl amine
Ethylphenyl amine
N-butyl toluidine The reaction between thioammeline and the chosen amine may be carried out in any suitable manner, but preferably is effected in the presence of an excess of the amine or in an inert solvent having a boiling point above 155° C., e. g., ethylene glycol. Little if any reaction occurs below about 150° C. The reaction is, therefore, preferably carried out above 150° C., more particularly at a temperature ranging between about 155° C. and about 195° C. This means that when amines having a boiling point materially below 150° C. or thereabouts are used in the reaction, it is necessary to effect reaction at superatmospheric pressures in order to attain the desired temperature.

If a high yield of mono-hydrocarbon-substituted melamine is desired, the reaction is stopped as soon as no more hydrogen sulfide is liberated from the reaction mixture. If a high yield of the tri-hydrocarbon-substituted melamine is desired, the reaction is continued after all of the hydrogen sulfide is liberated and until no more ammonia is liberated from the reaction mixture. These reactions may be represented by the following general equation:

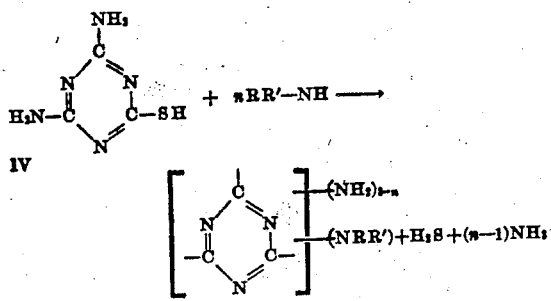

where $n$, R and R' have the same meanings as given above with reference to Formula I.

In order that those skilled in the art better may understand how the present invention may be carried into effect the following illustrative examples are given. All parts are by weight.

*Example 1*

| | Parts by weight |
|---|---|
| Thioammeline (0.25 mol) | 36 |
| Aniline (1.0 mol) | 93 |

The reaction mixture was made up in equimolecular proportions but the aniline hardly appeared to wet the thioammeline. The rest of the aniline was then added to give a heavy suspension and the reaction mixture was heated in an air-bath under a reflux condenser. The reaction temperature was approximately 180° C. Considerable hydrogen sulfide was evolved as checked by odor and by paper dipped in lead acetate solution.

As the heating was continued considerable yellow crystalline material formed in the condenser. This smelled strongly of hydrogen sulfide, was very volatile and soluble in water but insoluble in carbon bisulfide. Addition of sodium hydroxide to the aqueous solution liberated ammonia and addition of hydrochloric acid liberated hydrogen sulfide. Apparently this crystalline material is ammonium sulfide.

As this yellow material was formed the yellow color in the reaction flask due to the thioammeline or impurities disappeared and the precipitate became white in color.

The refluxing was continued for approximately 55 hours and at the end of that time the evolution of hydrogen sulfide had practically ceased. The reaction mixture was cooled and filtered. The precipitate was washed with very dilute hydrochloric acid to remove any remaining aniline and then stirred in 1000 parts of 10% potassium hydroxide for two hours to dissolve out any unreacted thioammeline. The suspension was filtered, washed well with water and dried; yield, 28 parts.

A small amount of this material was dissolved in hot alcohol. Cooling produced fraction A and the addition of water produced a second fraction, B. These were recrystallized several times but the melting points were not sharp, indicating mixtures.

A. M. P.: softened 225° C.; melted 229–230° C. N=37.0%

B. M. P.: melted 212–215° C. N=25.8%

| | Per cent |
|---|---|
| Theoretical N for monophenyl melamine | 41.6 |
| Theoretical N for diphenyl melamine | 30.2 |
| Theoretical N for triphenyl melamine | 24.0 |

The analysis indicates that A is mainly monophenyl melamine and B is mainly triphenyl melamine, both having a small amount of diphenyl melamine as an impurity which may be separated by further fractionation.

*Example 2*

| | Parts by weight |
|---|---|
| Thioammeline (0.1 mol) | 14.3 |
| Aniline (0.4 mol) | 37.2 |
| Hydrochloric acid | 1.5 |

The reaction was carried out by refluxing in a hot air bath at 165–170° C. after allowing the water to boil out through the reflux condenser. The evolution of hydrogen sulfide was extremely vigorous and within two hours the reaction mixture was clear and the evolution of hydrogen sulfide had practically ceased. On cooling, the reaction product set to a quite hard, solid mass which was broken up and extracted with 300 parts ethyl ether and filtered. A yield of 22 parts of the dried and purified product was obtained.

The ether filtrate was evaporated to dryness and the residue stirred with dilute hydrochloric acid. Nine parts of brown precipitate were obtained.

Twenty-one parts of the ether-insoluble product were ground very fine and stirred with 300 parts of 10% potassium hydroxide for two hours and filtered, washed and dried; yield, 18.3 parts. The filtrate was acidified but no precipitate formed. This shows that very little thioammeline remained unreacted and that the loss on caustic treatment is mainly due to the solubility of the product in water.

Some of this product was recrystallized from alcohol. The recrystallized product showed, on analysis, 32.2% nitrogen. The analysis indicated that this material (melting point 212–217° C.) was mainly diphenyl melamine. Repeated fractional crystallizations of the product, however, yielded mono-, di-, and tri-phenyl melamines. Sodium fusion showed a complete absence of sulfur.

Example 3

| | Parts by weight |
|---|---|
| Thioammeline (1 mol) | 143 |
| Aniline (4 mols) | 376 |
| Aniline hydrochloride | 13.6 |

The above reactants were heated at the boiling temperature of the mix under reflux for 11 hours at which time no more hydrogen sulfide was being expelled but the evolution of ammonia had not ceased. Further heating of the mixture until no more ammonia is evolved would produce mostly the triphenyl melamine.

The reaction mixture was allowed to stand until it became hard. Then it was broken up and stirred vigorously into 100 parts of hydrochloric acid in 2 liters of water. The suspension was filtered, washed, and dried; yield, 280 parts. The filtrate was neutralized with caustic and the excess aniline separated out on the surface.

The 280 parts were stirred into 56 parts potassium hydroxide in 2 liters of water, filtered, washed and dried; yield, 250 parts. Acidification of the filtrate produced 1.6 parts of precipitate, presumably thioammeline.

Fractional crystallization of the mixture with alcohol and alcohol-water mixtures followed by several fractional crystallizations of the resulting mixtures separated the original reaction product into fairly pure mono-, di-, and tri-phenyl melamine, as could be shown by nitrogen analysis.

Example 4

| | Parts by weight |
|---|---|
| Thioammeline (0.1 mol) | 14.3 |
| Aniline (1.0 mol) | 93 |
| Aniline hydrochloride | 1.36 |

These reactants were refluxed and the reaction mixture became clear in 2½ hours. Cooling and filtering yielded 6.3 parts of white crystalline product. Benzene added to the filtrate gave more product.

The 6.3 parts were washed first with dilute hydrochloric acid (yield, 5.6 parts), followed by washing with dilute potassium hydroxide; yield, 5.1 parts. The purified product showed, on analysis, 33.5% nitrogen. This is in close agreement with the nitrogen content of diphenyl melamine. However, several fractional crystallizations of this product showed that it could be separated into mono-, di- and tri-phenyl melamine, with the diphenyl melamine predominating and the mono- and tri-phenyl melamines being present in approximately equal amounts.

Example 5

This example is given to illustrate that hydrocarbon-substituted melamines cannot be formed from compounds that do not have a mercapto substituent. Specifically, an attempt was made to synthesize monophenyl melamine or a mixture of mono-, di- and tri-phenyl melamines by heating together a mixture of melamine and aniline under reflux at an elevated temperature.

| | Parts by weight |
|---|---|
| Melamine (0.1 mol) | 12.6 |
| Aniline (0.6 mol) | 55.8 | were heated together under reflux for 8 hours at 175–180° C. The melamine did not go into solution and no ammonia could be detected. One part of concentrated hydrochloric acid was then added and heating under reflux was continued for an additional 3 hours. Since no ammonia was evolved and no visible changes took place, the test was discontinued.

Other examples of hydrocarbon-substituted melamines that may be produced by our new and improved method are the mono-, di- and tri-substituted melamines produced from thio-ammeline and a primary amine, for example, the mono-, di- and tri-:

Methyl melamines
Ethyl melamines
Propyl melamines
Isopropyl melamines
Allyl melamines
Butyl melamines
Isobutyl melamines
Secondary butyl melamines
Butenyl melamines
Methallyl melamines
Tertiary-butyl melamines
Crotyl melamines
Amyl melamines
Ethallyl melamines
Heptyl melamines
Isoheptyl melamines
Octyl melamines
Decyl melamines
Isoamyl melamines
Hexyl melamines
Cyclohexyl melamines
Cyclohexenyl melamines
Cycloheptyl melamines
Cyclopentyl melamines
Cyclopentenyl melamines
Benzyl melamines
Para-chlorophenyl melamines
Phenethyl melamines
Tolyl melamines
Xenyl melamines
Naphthyl melamines
Propylphenyl melamines
Allylphenyl melamines
Xylyl melamines
Ethylphenyl melamines
Phenylisopropyl melamines and the di-, tetra- and hexa-substituted melamines of the above list which result from reaction of thioammeline with secondary amines corresponding to the named hydrocarbon substituent.

In a manner similar to the above with reference to the production of hydrocarbon-substituted melamines, which are symmetrical triazines, the corresponding asymmetrical and vicinal triazines may be prepared. It also will be understood by those skilled in the art from the foregoing description of the use of thioammeline in the described method that di-thioammelide and tri-thiocyanuric acid similarly may be employed as a reactant with a primary or a secondary amine.

What we claim as new and desire to secure by Letters Patent of the United States is:

1. The method of preparing hydrocarbon-substituted melamines corresponding to the general formula

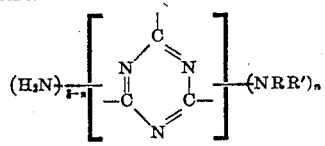

where $n$ is an integer and is at least 1 and not more than 3, R represents a monovalent hydrocarbon radical, and R' represents a member of the class consisting of hydrogen and monovalent hydrocarbon radicals, said method comprising heating a mixture comprising thioammeline and an amine selected from the class consisting of primary amines and secondary amines to a temperature above 150° C. to initiate reaction therebetween, continuing to heat the said mixture at a temperature above 150° C. at least until substantially all by-product hydrogen sulfide has been evolved, and isolating the desired hydrocarbon-substituted melamines from the resulting reaction mass as crystalline materials.

2. The method of preparing hydrocarbon-substituted melamines corresponding to the general formula

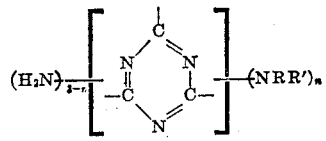

where $n$ is an integer and is at least 1 and not more than 3, R represents a monovalent hydrocarbon radical, and R' represents a member of the class consisting of hydrogen and monovalent hydrocarbon radicals, said method comprising heating an acidified mixture comprising thioammeline and an amine selected from the class consisting of primary amines and secondary amines to a temperature above 150° C. to initiate reaction therebetween, the said amine reactant being substantially in excess of equimolecular proportions, continuing to heat the said mixture at a temperature above 150° C. at least until substantially all by-product hydrogen sulfide has been evolved, and isolating the desired hydrocarbon-substituted melamines from the resulting reaction mass as crystalline materials.

3. The method of preparing hydrocarbon-substituted melamines corresponding to the general formula

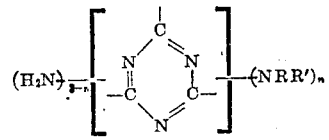

where $n$ is an integer and is at least 1 and not more than 3, R represents a monovalent hydrocarbon radical, and R' represents a member of the class consisting of hydrogen and monovalent hydrocarbon radicals, said method comprising heating an acidified mixture comprising thioammeline and an amine selected from the class consisting of primary amines and secondary amines to a temperature within the range of 155° to 195° C. to initiate reaction therebetween, the said amine reactant being present in an amount corresponding to at least four mols amine per mol thioammeline, continuing to heat the said mixture within the temperature range of 155° to 195° C. at least until substantially all by-product hydrogen sulfide has been evolved, and isolating the desired hydrocarbon-substituted melamines from the resulting reaction mass as crystalline materials.

4. The method of preparing hydrocarbon-substituted melamines corresponding to the general formula

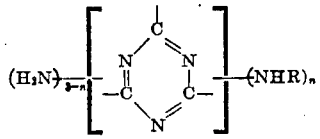

where $n$ is an integer and is at least 1 and not more than 3, and R represents a monovalent hydrocarbon radical, said method comprising heating a mixture comprising thioammeline and a primary amine at a temperature above 150° C. to initiate reaction therebetween, continuing to heat the said mixture at a temperature above 150° C. at least until substantially all by-product hydrogen sulfide has been evolved, and isolating the desired hydrocarbon-substituted melamines from the resulting reaction mass as crystalline materials.

5. The method of preparing hydrocarbon-substituted melamines corresponding to the general formula

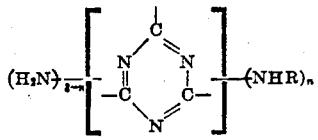

where $n$ is an integer and is at least 1 and not more than 3, and R represents an aryl radical, said method comprising heating an acidified mixture comprising thioammeline and a primary aromatic amine at a temperature above 150° C. to initiate reaction therebetween, continuing to heat the said mixture at a temperature above 150° C. at least until substantially all by-product hydrogen sulfide has been evolved, and isolating the desired hydrocarbon-substituted melamines from the resulting reaction mass as crystalline materials.

6. A method as in claim 5 wherein R represents an alkyl radical and the amine reactant is a primary saturated aliphatic amine.

7. The method of preparing hydrocarbon-substituted melamines corresponding to the general formula

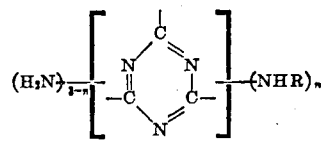

where $n$ is an integer and is at least 1 and not more than 3, and R represents a phenyl radical, said method comprising heating a mixture comprising thioammeline and aniline at a temperature above 150° C. to initiate reaction therebetween, continuing to heat the said mixture at a temperature above 150° C. at least until substantially all by-product hydrogen sulfide has been evolved, and separating the desired phenyl melamines from the resulting reaction mass as crystalline materials.

8. The method of preparing hydrocarbon-substituted melamines corresponding to the general formula

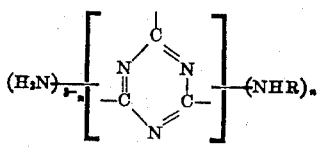

where $n$ is an integer and is at least 1 and not more than 3, and R represents an octyl radical, said method comprising heating a mixture comprising thioammeline and octyl amine at a temperature above 150° C. to initiate reaction therebetween, continuing to heat the said mixture at a temperature above 150° C. at least until substantially all by-product hydrogen sulfide has been evolved, and separating the desired octyl melamines from the resulting reaction mass as crystalline materials.

9. The method of preparing hydrocarbon-substituted melamines corresponding to the general formula

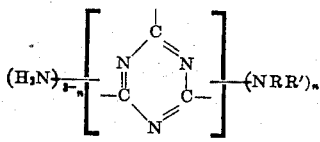

where $n$ is an integer and is at least 1 and not more than 3, R represents a monovalent hydrocarbon radical, and R' represents a member of the class consisting of hydrogen and monovalent hydrocarbon radicals, said method comprising heating a mixture including thioammeline and an amine selected from the class consisting of primary amines and secondary amines to a temperature above 150° C. to initiate reaction therebetween, continuing to heat the said mixture at a temperature above 150° C. until substantially all by-product hydrogen sulfide and some but not all by-product ammonia have been evolved, and separating the desired hydrocarbon-substituted melamines from the resulting reaction mass as crystalline materials.

10. The method of preparing hydrocarbon-substituted melamines corresponding to the general formula

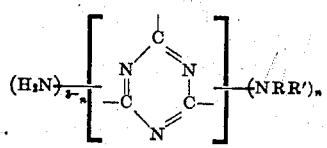

where $n$ is an integer and is at least 1 and not more than 3, R represents a monovalent hydrocarbon radical, and R' represents a member of the class consisting of hydrogen and monovalent hydrocarbon radicals, said method comprising heating a mixture including thioammeline and an amine selected from the class consisting of primary amines and secondary amines to a temperature above 150° C. to initiate reaction therebetween, continuing to heat the said mixture at a temperature above 150° C. until substantially all by-product hydrogen sulfide and ammonia have been evolved, and separating the desired hydrocarbon-substituted melamines from the resulting reaction mass as crystalline materials.

11. The method of preparing hydrocarbon-substituted melamines corresponding to the general formula

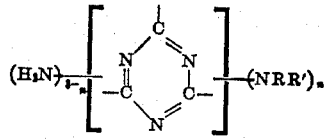

where $n$ is an integer and is at least 1 and not more than 3, R represents a monovalent hydrocarbon radical, and R' represents a member of the class consisting of hydrogen and monovalent hydrocarbon radicals, said method comprising initiating reaction at a temperature above 150° C. between thioammeline and an amine selected from the class consisting of primary amines and secondary amines while the said reactants are incorporated in an inert solvent having a boiling point above 155° C., continuing the reaction between the said reactants while they are incorporated in the said solvent at a temperature above 150° C. at least until substantially all by-product hydrogen sulfide has been evolved, and separating the desired hydrocarbon-substituted melamines from the resulting reaction mass as crystalline materials.

12. The method of preparing hydrocarbon-substituted melamines corresponding to the general formula

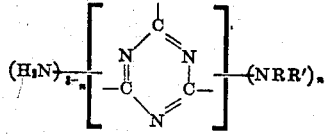

where $n$ is an integer and is at least 1 and not more than 3, R represents a monovalent hydrocarbon radical, and R' represents a member of the class consisting of hydrogen and monovalent hydrocarbon radicals, said method comprising initiating reaction at a temperature above 150° C. between thioammeline and an amine selected from the class consisting of primary amines and secondary amines while the said reactants are admixed with a small amount of a mineral acid salt of the said amine, continuing the reaction between the said reactants in the presence of the said salt at least until substantially all by-product hydrogen sulfide has been evolved, and separating the desired hydrocarbon-substituted melamines from the resulting reaction mass as crystalline materials.

13. The method of preparing mono-, di- and tri-phenyl melamines which comprises heating thioammeline, aniline and a small amount of a mineral acid salt of aniline under reflux at the boiling temperature of the mass at least until substantially all by-product hydrogen sulfide has been evolved, said aniline and thioammeline being employed in an amount corresponding to at least four mols aniline per mol thioammeline, and separating mono-, di- and tri-phenyl melamines from the resulting reaction mass.

GAETANO F. D'ALELIO.
JAMES J. PYLE.